(12) United States Patent
Bryant

(10) Patent No.: US 9,193,397 B2
(45) Date of Patent: Nov. 24, 2015

(54) LATERAL EXPANDING CARGO BED

(71) Applicant: GM Global Technology Operations LLC, Detroit, MI (US)

(72) Inventor: Wade W. Bryant, Grosse Pointe Farms, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 58 days.

(21) Appl. No.: 14/109,185

(22) Filed: Dec. 17, 2013

(65) Prior Publication Data

US 2015/0166126 A1 Jun. 18, 2015

(51) Int. Cl.
*B60R 7/00* (2006.01)
*B62D 33/08* (2006.01)
*B62D 33/02* (2006.01)

(52) U.S. Cl.
CPC ............. *B62D 33/08* (2013.01); *B62D 33/02* (2013.01)

(58) Field of Classification Search
CPC ............................... B62D 33/08; B62D 33/02
See application file for complete search history.

(56) References Cited

U.S. PATENT DOCUMENTS

2008/0217945 A1* 9/2008 Barnes .................... 296/26.13

* cited by examiner

Primary Examiner — Lori L Lyjak
(74) Attorney, Agent, or Firm — BrooksGroup

(57) ABSTRACT

A number of illustrative variations may include a dynamically expandable cargo bed for a vehicle.

14 Claims, 2 Drawing Sheets

LATERAL EXPANDING CARGO BED

TECHNICAL FIELD

The field to which the disclosure generally relates to includes cargo beds.

BACKGROUND

In urban areas, delivery vehicle operators struggle to quickly load and unload goods.

SUMMARY OF ILLUSTRATIVE VARIATIONS

A number of illustrative variations may include a dynamically expandable cargo bed for a vehicle.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figure 1:
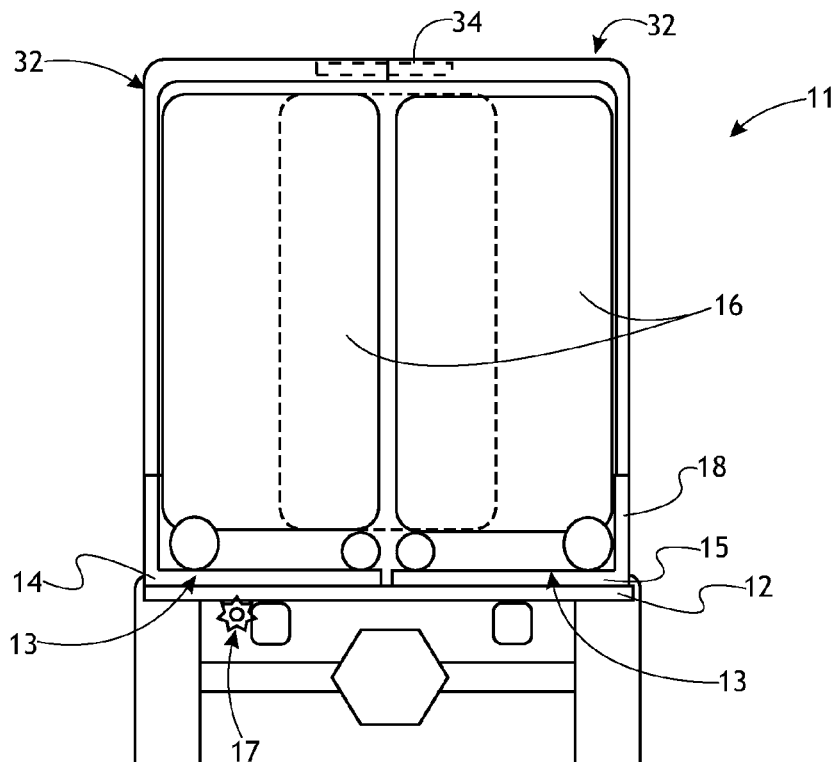
FIG. 1 shows a lateral view of the retracted state of an expandable cargo bed.

The following description of the variations is merely illustrative in nature and is in no way intended to limit the scope of the invention, its application, or uses.

In a number of illustrative variations an expandable cargo bed 11 for a vehicle 31 may be defined by a base surface 12 above which a first and second portion 14, 15 of a longitudinally divided bed platform 13 sits. Cargo 16 may be loaded onto, unloaded from and transported upon the first and second portions 14, 15 of the bed platform 13. The first and second portions 14, 15 of the bed platform 13 as well as the base surface 12 need not be flat, but may be sufficiently horizontal so as to enable the exertion of a normal force upon anything which may rest upon them. The base surface 12 need not be the width of the vehicle's frame 32 but may instead be narrower or wider than the vehicle's frame 32. Similarly, the combined width of the bed platform portions 14, 15 need not be an equivalent width to the base surface 12 but may be wider or narrower than the base surface 12. The base surface 12 and or bed platform portions 14, 15 may have defined in them a space, including but not limited to a wheel well 30, to account for some other part of the vehicle 31, including but not limited to a wheel.

Figure 2:
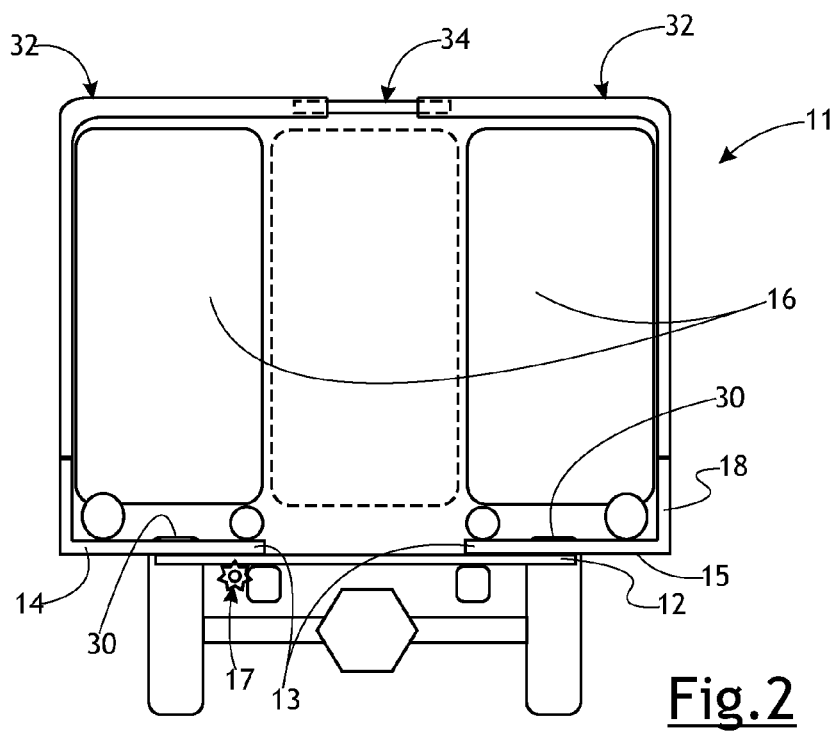
FIG. 2 shows a lateral view of the expanded state of an expandable cargo bed.
Figure 3:
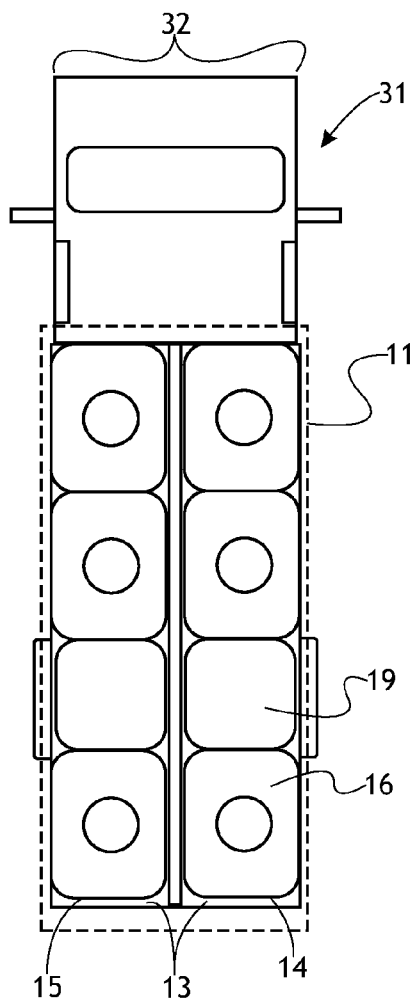
FIG. 3 shows a bird's eye view of the retracted state of an expandable cargo bed.

In a number of illustrative variations, the expandable cargo bed 11 comprises a longitudinally divided bed platform 13, having first and second bed platform portions 14, 15 that retract inboard and expand outboard. One variation of the retracted and expanded states of the expandable cargo bed 11 is illustrated in FIG. 1 and FIG. 2 respectively. Retraction and expansion of the bed platform 13 may be facilitated by a bed platform movement device 17. Any number of devices may be suited to assist and/or perform the mechanical movement of the first and/or second bed platform portion 14, 15, whether or not they are burdened with cargo and therefore qualify as a bed platform movement device 17. Bed platform movement devices may include but are not limited to a roller track, a maglev track, a mechanical actuator including but not limited to a rack and pinion, gear and pinion, or a pneumatic or hydraulic piston, an electronic actuator including but not limited to an electronic telescoping rod, or an electric piston, or any other suitable device which is known in the art or any combination of the aforementioned. A burdened variation of the first and second bed platform portions 14, 15 is shown in FIG. 3.

Figure 4:
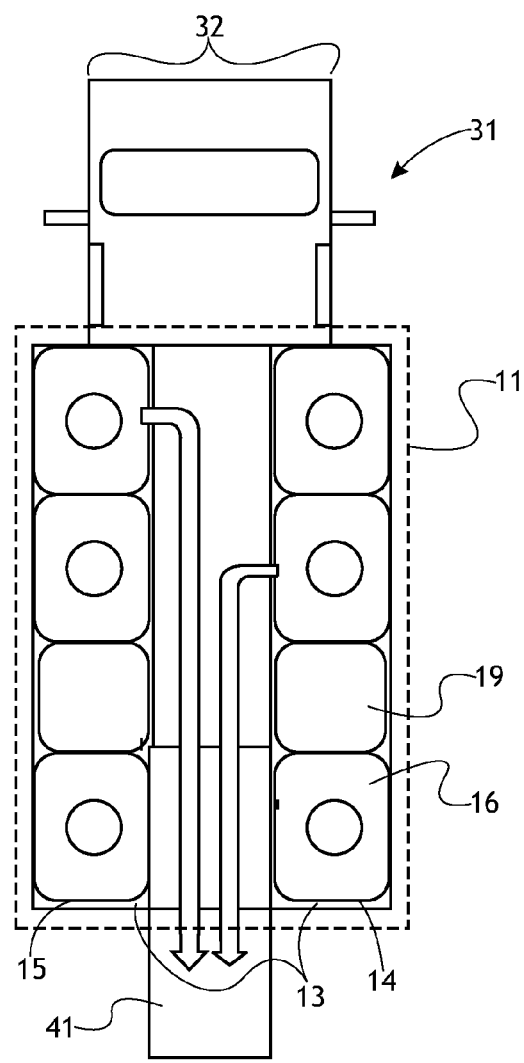
FIG. 4 shows a bird's eye view of the expanded state of an expandable cargo bed, as well as the deployment of an accessibility assistance device from the rear of the vehicle.

In a number of illustrative variations, the first and second bed platform portions 13, 15 may be moved independent of one another, dynamically, by more than one bed platform movement device 17. The bed platform movement device(s) 17 may also facilitate a partial expansion or retraction of the bed platform portions 14, 15. Optionally, the first and/or second bed platform portions 14, 15 may be dynamically locked in place by locking methods known in the art including but not limited to limiting the movement of the bed platform movement device(s) 17, which may be mechanically engaged to the first and second bed platform portions 14, 15 or securing the bed platform portions 14, 15 with a mechanical or electric locking mechanism. When a bed platform portion is moved outboard, the base surface 12 may serve as an aisle way for loading or unloading cargo, as shown in FIG. 4.

In a number of illustrative variations, included in the first and/or second portion(s) of the bed platform 14, 15 and/or the base surface 12, there may be a movement obstruction element 18, including but not limited to a protrusion, a wall and/or a rail, to disallow unwanted lateral movement of cargo 16. A movement obstruction element 18, as used herein, describes an element which is disposed to exert centripetal force upon objects or cargo 16 which would fly from the expandable cargo bed 11 were the movement obstruction element 18 not present. A compartment 19 (FIGS. 3-4) which can hold cargo may be permanently or temporarily hung or mounted upon a sufficiently vertical movement obstruction element 18, including but not limited to a wall and/or rail. Optionally, the compartment 19 may be mounted on a sufficiently vertical movement obstruction element 18 above a wheel well, and/or share a mounting between multiple sufficiently vertical movement obstruction element(s) 18. Additionally, when the arrangement of one or more sufficiently vertical movement obstruction elements 18 permits, an expandable roof may be attached to, supported by and/or set upon the sufficiently vertical movement obstruction element(s) 18 of the expandable cargo bed 11. As an option, the roof can expand with the expansion of the expandable cargo bed 11 by other means including but not limited to elastic stretching or expansion segment 34.

In a number of illustrative variations, an accessibility assistance device 41, including but not limited to a ramp or lift platform, may be mounted on the expandable cargo bed 1 either permanently or as an optional module. The ramp and/or lift platform may be mounted on a track which allows stowage of the accessibility assistance device, underneath the cargo bed in some variations, when not in use.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a laterally expanding cargo bed for a vehicle comprising: a base surface above which a first and second portion of a longitudinally divided bed platform sit and one or more bed platform movement devices which are suited to assist and/or perform the mechanical movement of a first and/or second bed platform portion.

Variation 2 may include the product of Variation 1 wherein the base surface has space defined in it to account for a wheel.

Variation 3 may include the product of any of Variations 1-2 wherein the expandable cargo bed is expanded outboard of the vehicle and retracted inboard of the vehicle using a rack and pinion.

Variation 4 may include the product of any of Variations 1-3 wherein the expandable cargo bed is expanded outboard of the vehicle and retracted inboard of the vehicle using a hydraulic piston.

Variation 5 may include the product of any of Variations 1-4 wherein the expandable cargo bed is expanded outboard of the vehicle and retracted inboard of the vehicle using an electric piston.

Variation 6 may include the product of any of Variations 1-5 wherein the expandable cargo bed expansion and retraction is assisted by use of a roller track.

Variation 7 may include the product of any of Variations 1-6 wherein the first and second bed platform portions may be moved independently of one another.

Variation 8 may include the product of any of Variations 1-7 wherein the first and/or second bed platform portion may be locked in place.

Variation 9 may include the product of any of Variations 1-8 wherein the expandable cargo bed further comprises an accessibility assistance device.

Variation 10 may include the product of any of Variations 1-9 wherein the accessibility assistance device is a ramp.

Variation 11 may include the product of any of Variations 1-10 wherein the first and/or second portion(s) of the bed platform and/or the base surface include a movement obstruction element.

Variation 12 may include the product of Variation 11 wherein the movement obstruction element is substantially vertical and has mounted thereupon a compartment which can hold cargo.

Variation 13 may include the product of any of Variations 11-12 wherein the movement obstruction element is substantially vertical and has an expandable roof attached to, supported by and/or set upon it.

Variation 14 may include the product of Variation 13 wherein the expandable roof expands by means of elastic stretching.

The above description of select variations within the scope of the invention is merely illustrative in nature and, thus, variations or variants thereof are not to be regarded as a departure from the spirit and scope of the invention.

What is claimed is:

1. A product comprising:
    an expanding cargo bed for a vehicle comprising a base surface above which at least a first and second portion of a divided bed platform sit; and
    one or more bed platform movement devices which are suited to assist or perform the mechanical movement of at least one of the divided bed platform portions;
    wherein the expandable cargo bed is constructed and arranged to expand outboard of the vehicle and to retract inboard of the vehicle via movement of at least one of the portions of the divided bed platform; and,
    wherein cargo may sit upon at least one of the portions of the divided bed platform, and be moved with and upon at least one of the portions of the divided bed platform throughout the entirety of cargo bed expansion and retraction.

2. The product of claim 1 wherein a space is defined within the base surface in order to account for a wheel.

3. The product of claim 1 further comprising a rack and pinion device, wherein the expandable cargo bed is constructed and arranged to expand outboard of the vehicle and to retract inboard of the vehicle using the rack and pinion.

4. The product of claim 1 further comprising a hydraulic piston, wherein the expandable cargo bed is constructed and arranged to expand outboard of the vehicle and to retract inboard of the vehicle using the hydraulic piston.

5. The product of claim 1 further comprising an electric piston, wherein the expandable cargo bed is constructed and arranged to expand outboard of the vehicle and to retract inboard of the vehicle using an electric piston.

6. The product of claim 1 wherein the expandable cargo bed expansion and retraction is assisted by a roller track.

7. The product of claim 1 wherein the bed platform portions are constructed and arranged to move independently of one another.

8. The product of claim 1 wherein at least one of the platform portions is constructed and arranged to be selectively locked in place.

9. The product of claim 1 wherein the expandable cargo bed further comprises an accessibility assistance device.

10. The product of claim 9 wherein the accessibility assistance device is a ramp.

11. The product of claim 1 wherein at least one of the bed platforms or the base surface include a movement obstruction element.

12. The product of claim 11 wherein the movement obstruction element is substantially vertical and has mounted thereupon a compartment which can hold cargo.

13. The product of claim 11 wherein the movement obstruction element is substantially vertical and has an expandable roof attached to, supported by or set upon the movement obstruction element.

14. The product of claim 13 wherein the expandable roof expands by means of elastic stretching.

* * * * *